United States Patent [19]
Motter et al.

[11] 3,872,231
[45] Mar. 18, 1975

[54] SYSTEM FOR DETERMINING ELECTRODE LENGTH

[75] Inventors: James W. Motter; Connie A. Allen, both of Huntsville, Ala.

[73] Assignee: Toroid Corporation, Huntsville, Ala.

[22] Filed: May 23, 1974

[21] Appl. No.: 472,555

[52] U.S. Cl. ................................................ 13/13
[51] Int. Cl. .......................... H05b 7/12, F27d 11/10
[58] Field of Search ............................. 13/9, 12, 13

[56] References Cited
UNITED STATES PATENTS

| | | | |
|---|---|---|---|
| 3,179,734 | 4/1965 | Redel et al. | 13/12 |
| 3,405,219 | 10/1968 | Sivet | 13/12 |
| 3,622,678 | 11/1971 | Allen | 13/13 |

*Primary Examiner*—R. N. Envall, Jr.

[57] ABSTRACT

A system for the measurement of lengths of electrodes employed in electric arc furnaces wherein initially approximately accurate-length signals are obtained by adding a weight signal to a current derived buoyancy signal. Then a more accurate measurement is determined by averaging a number of such signals, sampled at times when an electrode has just been selectively elevated responsive to an arc current signal.

4 Claims, 2 Drawing Figures

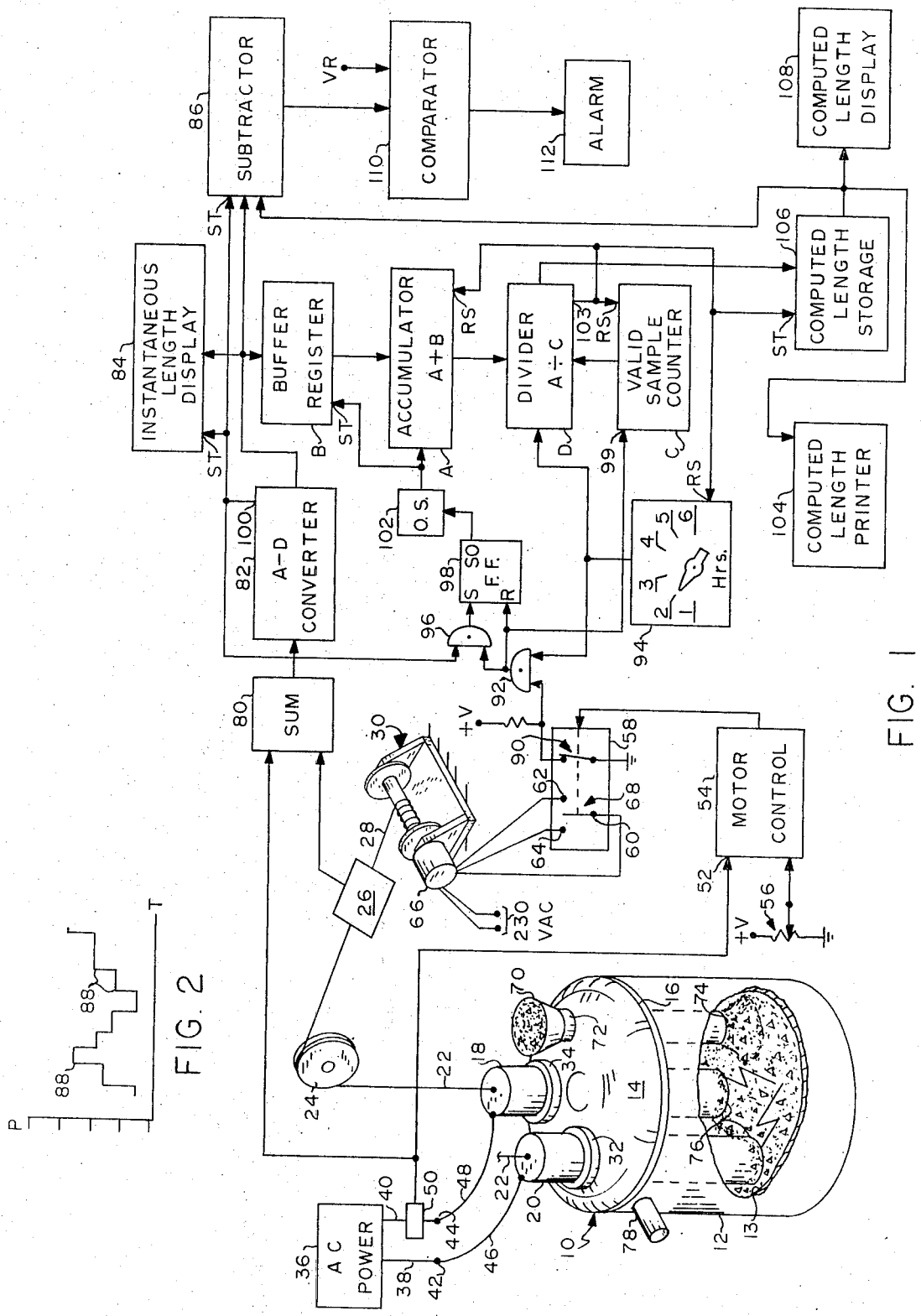

SYSTEM FOR DETERMINING ELECTRODE LENGTH

FIELD OF THE INVENTION

This invention relates to systems for monitoring the length of electrodes in electric arc furnaces, particularly to such a system wherein the length is monitored in terms of electrode weight.

BACKGROUND OF THE INVENTION

On the surface, it would appear that the measurement of length of electrodes in an electric arc furnace would be relatively simple. Electrodes are of a constant density; that is, they weigh X number of pounds per foot of length. However, difficulties arise because there are many extraneous forces exerted upon the electrodes which effect their measured weight. One such force is the plasma force which is determined by the amount of current flowing through an electrode. An illustration of the magnitude of such forces is that with electrodes carrying between 30,000 and 40,000 amperes of current, the plasma forces may exercize buoyancy forces upward on an electrode in the order of 35,000 to 40,000 pounds. To further complicate the problem, electrodes are immersed in a varying composition of ore, raw ore, and other ingredients. This mixture, varying in volume and constituting a varying frictional force on the side of an electrode, absorbs a varying amount of the weight. In certain times of the process, it is possible for the electrode to be lowered down into a hard rock or other solid piece of material in the bottom of the furnace. Of course, when this happens, a considerable portion of the weight of an electrode is borne by the furnace shell itself. Added to the complexity of the problem is the fact that the operator of such a furnace is continually raising and lowering electrodes, trying to hold a constant current draw through the electrodes.

The present invention is directed to the control of the length of the electrode, and thus enabling an operator to more specifically determine the depth into the furnace which an electrode is actually inserted or immersed. To the knowledge of the applicants, present efforts to control and measure electrode lengths sufficient for such determinations have been inadequate.

Accordingly, it is the object of this invention to provide an improved and more accurate system of measurement of lengths of electrodes employed in electric furnaces.

SUMMARY OF THE INVENTION

In accordance with the present invention, instantaneous measurements of electrode lengths are obtained by summing a weight signal derived from cable tension suspending an electrode and from a signal derived from current flow through an electrode which reflects buoyant effect upon the electrode. A plurality of signals derived in this manner are then averaged over selected intervals to provide an extremely accurate indication of electrode length.

BRIEF DESCRIPTION OF THE DRAWINGS

FIG. 1 is a schematic diagram of an embodiment of the invention.

FIG. 2 is a diagram illustrating an aspect of operation of the system of this invention.

DETAILED DESCRIPTION OF THE DRAWINGS

Referring to the drawings, FIG. 1 illustrates in schematic form a system for the control of the depth of electrode insertion into an electric arc furnace and for measuring the electrode length. Typically, such a furnace would employ three electrodes and would be powered by three-phase alternating current of a voltage on the order of 500 volts at 35,000 amperes. An electrical circuit, or arc, occurs between electrodes through the material being heated. In order to illustrate the present invention in basic terms, only two electrodes are shown. Since there is a complete height control and length measurement system for each electrode, only one system of control and measurement is shown.

As an example, arc furnace 10 is discussed in terms of its use as a reduction facility in the production of phosphorus. The outer enclosure 12 of furnace 10 is typically of steel and the interior 13 lined with carbon. Domed cover 14 of furnace 10 is typically cast of a material which is electrically nonconductive and is sealably supported by upper rim 16 of furnace 10. As discussed above, FIG. 1 shows two of the three electrodes of a furnace, electrodes 18 and 20, each being supported by a length of flexible cable 22 which is attached to the top end of each electrode. Cable 22 extends over pulley 24 to one end of force sensing load cell assembly 26. The opposite end of load cell assembly 26 is held by cable 28 which is wound onto motorized winch 30. Winch 30 is in turn supported to a solid or fixed structure, not shown.

Electrodes 18 and 20 are inserted and are adjustable in elevation through friction reducing seals 32 and 34 provided in domed cover 14. Power is supplied from power source 36 through lines 38 and 40 to terminals 42 and 44, in turn connected by flexible cables 46 and 48 to electrodes 20 and 18, respectively. Current to each electrode, supplied through one of the power lines 42 and 44, is sampled by current sensor 50. As discussed above, there are discrete circuits and systems for each electrode, and thus there would be a current sensor for each electrode. This is particularly important in three-phase systems in order to determine the distribution of current since the current through one electrode would not necessarily indicate the current through one of the other electrodes.

The output of current sensor 50 is coupled as one input 52 to motor control 54. A second or reference input to motor control 54 is provided by potentiometer 56, the movable arm of which provides an adjustable reference voltage to motor control 54, which voltage is calibrated in terms of the output of current sensor 50 such that a selected position of potentiometer 56 provides a voltage equal to a voltage output of current sensor 50 for a selected current level. Motor control 54 is basically a conventional comparator-amplifier wherein voltages from current sensor 50 and potentiometer 56 are compared, and depending upon whether there is a difference and the polarity of this difference, there is provided a particular polarity output to motor contactor relay 58, causing it to turn on when there is a difference and to be operated to close the circuit between contacts 60 and 62 when the current level is below a desired current level and to close contacts 60 and 64 when the current level is above a desired level. Thus, as shown, the two stationary contacts of motor contactor relay 58 are wired to directional terminals of motor 66 of winch 30 and the movable arm contact 60 is connected to a common terminal of motor 66. In this fashion, motor 66, which is typically powered from a 230-volt A.C. power source, is energized to rotate in a selected direction as determined by contacts 68. The result is that when there is a "low current" output from motor control 54, motor 66 is operated in a direction to cause winch 30 to lower electrode 18 into the furnace, causing increased current; and with a "high current" output from motor control 54, motor 66 is operated in the opposite direction to cause electrode 18 to be raised.

Raw material or ore from which phosphorus is extracted, while being rich in phosphate, also contains silica, various metals and other minerals and rocks, etc. It is supplied through hopper 70 positioned atop furnace 10 which has an inner feeder pipe 72 which penetrates the interior of this furnace somewhat above the level of the expected operating level of the constituents within the furnace. Thus when material is fed into hopper 70, typically from a conveyor (not shown), the furnace is charged until the raw material pyramids upward to close off the lower end 74 of feeder pipe 72. With power applied to electrodes 18 and 20, an arc is produced between the lower ends 76 of electrodes 18 and 20, and this arc permeates and heats the constituents of the furnace. In this fashion, phosphorus may be produced on a substantially continuous basis.

Ideally, two circumstances would prevail in the furnace. Current in all of the electrodes would be maintained at a selected value, and the height of electrodes would be maintained at a desired level with respect to constituents in the bottom of the furnace.

Along with the phosphorus, which is produced in gaseous form, other gases are produced with the total mixture of gases being extracted from outlet duct 78, located near the upper rim of furnace 10. These gases are passed through a condenser (not shown), wherein they are cooled to approximately 100°F. to 120°F. which liquifies the phosphorus, enabling it to be drawn off and separated from the other gases.

The conductivity and level of the constituents within furnace 10 are constantly changing as constituents are converted to a molten state and wherein iron and other metallic components settle to the lower portion of the furnace. These effects produce changes in current flow for a given electrode level, and thus the need for vary the electrode level to maintain a selected current and thus heat level in the furnace. As a result of the shifting levels of the constituents and the conductivity of the constituencies, there is necessitated an essentially constant requirement for the adjustment of electrodes 18 and 20 in order to maintain the desired current level.

In addition to the necessity of maintaining a desired level of current flow through each electrode, it has been determined that it is also necessary to observe the distance between the bottom of an electrode and the bottom of the furnace. One reason for this is that under certain circumstances it has been found that if this is not known, it is possible to lower an electrode beyond its desired operating level and, in fact, cause it to strike the bottom of the furnace. This may cause damage to the furnace and/or cause current peaks which could not be handled by the system or source of power.

Further, it is to be appreciated that in such a volatile and dangerous environment, it is almost impossible to visually determine the length of an electrode and thus its penetration into the furnace. An alternate and workable method is to determine the weight of each electrode. Since an electrode has a known weight per linear foot or inch, measurement of length can be thus computed.

In accordance with the present invention, load cell assembly 26 performs the function of providing an electrical output responsive to the sensed weight of an electrode. Load cell assembly 26 is a conventional assembly and includes circuitry for providing balancing signals to eliminate noise, and for span compensation, to provide the necessary calibration in terms of length rather than weight. The thus derived apparent length signal is fed to one input of summing device 80. To compensate for the buoyancy error of this signal, an oppositely calibrated buoyancy signal, calibrated in terms of force corrected to equivalent length of electrode 18 is fed to a second input of summing device 80. The output of summing device 80, an analog signal, is coupled to A-D converter 82 which provides as an output a digital number representative of electrode length. This is provided as one input to buffer register B. It is also provided as an input to instantaneous length display 84 from which length can be observed, and as an input to subtractor 86 for purposes which will be later described.

The instantaneous length indications provided by the system as thus far described and displayed on instantaneous display 84 are necessarily approximate inasmuch as there are dynamic forces within the furnace, including periodic explosions, acting on the electrodes which are not readily measurable, which variably add to and subtract from the static weight of an electrode, and which operate somewhat independently of the current produced buoyant force which the system does compensate for. Thus, the output of summing device 80, and thus A-D converter 82, is of a signal which constantly varies to provide outputs above and below a signal indicating the precise length of electrodes at a given time. To overcome this problem, the present invention samples outputs of A-D converter 82 at times when certain conditions exist and then averages these; and in so doing, it has been found that sufficient accuracy of measurement of electrode lengths may be obtained. As an example of operation, we will assume that in general it is known that the furnace consumes approximately one inch of electrode in four hours. Then, and in accordance with the present invention, a reading of sufficient accuracy for most purposes can be obtained by averaging readings for a period of two hours, and this is accomplished as follows.

Referring to FIG. 2, which is an example of electrode position (P) or movement versus time (T), length samples are taken at the completion of each electrode lifting cycle 88. It has been found that at such times an electrode is least affected by environmental forces. To achieve sampling at such times, contacts 90 of motor contact or relay 58 close following a lifting cycle, and thus provide, in the form of a ground input to AND gate 92, a sample initiate signal. At the same time, or just prior thereto, timer 94 is set, for example, for a two-hour period. It also provides a gating input to AND gate 92, and thereby enabling this gate and causing gating inputs to be applied to AND gate 96, to the reset input R of flip flop 98 and to count input 99 of valid sample counter C. This steps counter C one count, resets flip flop 98, and upon receipt of an end of conversion output from output 100 of A-D converter 82 by AND gate 96, flip flop 98 changes to a set state, triggering one shot 102. In turn, the output of one shot 102 applies a strobe signal to buffer register B to transfer a length digit into accumulator A. Since this is the first length signal, we are in effect adding this signal to zero, and thus the digit in accumulator A is of the same value as that transferred to buffer register B. One shot 102 also provides an initiate signal to accumulator A to cause the number from buffer register B to be added to the total already in accumulator A. Since flip flop 98 remains set until the level on reset input R rises and again falls to zero, one shot 102 cannot be energized again until this occurs. Each time that it does occur as shown in FIG. 2, a sequence of events just described will repeat, and repeatedly, outputs from A-D converter stored in buffer register B at the time of a valid sample signal an input to AND gate 96 will produce accumulative addition in accumulator A, and this will continue until the end of the time period set in timer 94, or two hours, as indicated.

At the end of the selected time, timer 94 provides an output signal level to AND gate 92 which inhibits AND 92 and provides a command to divider D. Divider D is adapted to operate with summed lengths as a dividend input and a count of lengths as a divisor input. Divider D provides, at the end of the division process, a divide complete signal at output 103 which resets accumulator A to zero, sets valid sample counter C to zero, and strobes the quotient from divider D to computed length storage register 106. The output of computed length storage 106 is also available as an input to computed length display 108, typically a digital readout, and to computed length printer 104.

The output of the divide complete command is also applied to reset input RS of timer 94 to reset it for another two-hour timing period.

The output of computed length storage 106 is available as a continuous input to subtractor 86 during the next timed period. Thus, there is applied to subtractor 86 a closely computed value of length. There is also provided as an input to subtractor 86 an output from A-D converter 82 which continuously provides instantaneous values of length at a rate per second or as otherwise selected. Subtractor 86 then continuously provides, as an output, a subtraction of the two input lengths. This output is applied to comparator 110, which is also supplied a reference signal VR, representative of a maximum permissable difference in length indicated by these signals. Comparator 110 then provides an output to alarm 112 whenever such a difference in length occurs. Typically, this would provide alarm in cases where an electrode would break off by a significant amount, and thus the instantaneous length signal from A-D converter 82 would be less by a selected amount than the indicated length output from divider D. This would enable shutdown of the system or quick readjustment or other corrective measures to keep the furnace properly operating.

What is claimed is:

1. A system for measuring the length of an electrode suspended in an arc furnace comprising:

suspension means for suspending a said electrode in a furnace;

electrical force indicating means coupled to said suspension means for providing an electrical output representative of the force reflected on said suspension means by said electrode.

elevation means for selectively raising and lowering said electrode in said furnace;

current sensing means for providing an output signal representative of the current flow through said electrode; summing usumming means responsive to the output of said force indicating means and said current sensing means for providing an output generally indicative of the length of said electrode;

analog-to-digital conversion means for periodically providing a signal representative of instantaneous length;

accumulating means responsive to the output of said analog-to-digital conversion means for sequentially, at selected times, summing instantaneous lengths provided by said analog-to-digital conversion means;

counting means for providing an accumulated count responsive to the lengths accumulated by said accumulator means;

division means responsive to a dividend signal from said accumulating means and a divisor signal from said counting means for providing as a quotient a signal representative of the average lengths of the sample lengths accumulated; and means responsive to said division means for indicating a said average length.

2. A system as set forth in claim 1 further comprising subtraction means responsive to the output of said division means and said analog-to-digital conversion means for providing a length difference output; and comparator means responsive to reference length signal and the output of said subtraction means for indicating an alarm condition whenever a difference signal from subtractor means exceeds a selected value.

3. A system as set forth in claim 2 comprising means responsive to said elevation means for selecting outputs from said analog-to-digital conversion means at the conclusion of a cycle of raising of a said electrode.

4. A system as set forth in claim 3 wherein said elevation means comprises means responsive to a reference level signal and an output of said current sensing means for raising a said electrode whenever said current sensing signal is greater than said reference signal and lowering said electrode when said current sensing signal is less than said reference signal.

* * * * *